United States Patent
Quinquis et al.

(10) Patent No.: US 6,952,412 B1
(45) Date of Patent: Oct. 4, 2005

(54) ACCESS NETWORK FOR MOBILE TERMINALS

(75) Inventors: Jean-Paul Quinquis, Perros-Guirec (FR); Olivier Roussel, Perros-Guirec (FR)

(73) Assignee: France Telecom SA, Paris (FR)

( * ) Notice: Subject to any disclaimer, the term of this patent is extended or adjusted under 35 U.S.C. 154(b) by 0 days.

(21) Appl. No.: 09/786,910

(22) PCT Filed: Aug. 11, 1999

(86) PCT No.: PCT/FR99/01969

§ 371 (c)(1),
(2), (4) Date: Mar. 12, 2001

(87) PCT Pub. No.: WO00/16585

PCT Pub. Date: Mar. 23, 2000

(30) Foreign Application Priority Data

Sep. 11, 1998 (FR) .................................. 99 11405

(51) Int. Cl.$^7$ ............................ H04Q 7/20; H04J 3/24; H04L 12/28
(52) U.S. Cl. ...................... 370/338; 370/349; 370/397; 370/409; 370/410
(58) Field of Search .................... 370/310.1, 310.2, 370/329, 331, 340, 395.1, 338, 395.2, 397, 370/357, 395.3, 398, 399, 349, 401, 465, 370/466; 455/450, 507, 509, 517

(56) References Cited

U.S. PATENT DOCUMENTS

| | | | | |
|---|---|---|---|---|
| 5,633,868 A | * | 5/1997 | Baldwin et al. | ............. 370/331 |
| 5,787,077 A | * | 7/1998 | Kuehnel et al. | ............. 370/331 |
| 5,875,185 A | * | 2/1999 | Wang et al. | ................. 370/331 |
| 5,907,542 A | * | 5/1999 | Kuehnel et al. | ............. 370/331 |
| 6,574,221 B1 | * | 6/2003 | Petersen | ................... 370/395.1 |

FOREIGN PATENT DOCUMENTS

EP          0 679 042          10/1995

* cited by examiner

Primary Examiner—Alpus H. Hsu
Assistant Examiner—Lee Khuong
(74) Attorney, Agent, or Firm—Lowe, Hauptman & Berner, LLP

(57) ABSTRACT

An access network for mobile terminals includes a switch arranged to be connected to at least one external network and a local access network connected to a plurality of radio base stations. Each base station is arranged to enter into communication with mobile terminals, each terminal being arranged for receiving or sending user cells on a virtual channel identifiable by a fixed virtual path identifier and a specific virtual circuit identifier allocated thereto at the time a call is established. Signaling cells on a virtual channel are identified by a specific virtual path identifier and a specific fixed virtual circuit identifier. The switch allocates a virtual path identifier and a virtual circuit identifier to each user channel. To each signaling channel, the switch allocates a virtual path identifier equal to the virtual path identifier of the user circuit and a fixed virtual circuit identifier.

8 Claims, 1 Drawing Sheet

ACCESS NETWORK FOR MOBILE TERMINALS

CROSS-REFERENCE TO RELATED APPLICATIONS

This is a U.S. National Phase and claims the benefit of the filing date of PCT/FR99/01969, filed Aug. 11, 1999, and also claims the benefit of priority under 35 U.S.C. §119 of French Application No. 98/11405, filed Sep. 11, 1998, the entire disclosures of which are hereby herein incorporated by reference.

BACKGROUND OF THE INVENTION

The present invention concerns an access network for mobile terminals of the type which consists of a switch connected on the one hand to at least one other external network and on the other hand to a local access network itself connected to a plurality of radio base stations, each base station being designed to enter into communication with mobile terminals.

The present invention is situated in the context of access networks for mobiles based on ATM (Asynchronous Transfer Mode) technology. More precisely, it concerns access networks for mobiles which are based on end-to-end ATM technology, both in the control plane and in the user plane. Consequently the mobile terminals envisaged in the present invention support applications which justify the use of this ATM technology designed for the transfer of data at high speeds. Amongst these applications there can be cited, by way of example: video telephony, high-speed data transmissions, the consultation of Internet servers, etc.

The patent document U.S. Pat. No. 5,787,077 describes a network whose ATM technology is used end to end.

In the known networks for access to mobiles, ATM technology is envisaged only as far as the access to the radio base station, also referred to as the base station. In these known networks, the mobile terminals cannot support the stacks of the protocols which are specific to this ATM technology. Also, the targeted field of application is generally that of cellular radiocommunication networks.

In the document U.S. Pat. No. 5,787,077, the fact that ATM technology is used end to end, both in the control plane and in the user plane, means on the one hand that the items of information transmitted over the radio medium between the mobile terminals and the local network are ATM cells, and on the other hand that the signalling messages for establishing calls which are transmitted or received by the mobiles and the switch are in accordance with the standards recommended by the ITU.

In general terms, in ATM technology, each virtual connection is identified by a virtual path identifier and a virtual circuit identifier. One of the problems resolved by the technique described in the document U.S. Pat. No. 5,787,077 mentioned above is that of the adaptation of the virtual path identifiers and the virtual circuit identifiers to the radio environment between the base stations and the mobile terminals.

A recurrent problem with access networks for mobile terminals is that of mobility. When a terminal moves whilst it is within the coverage of an access network, it may be attached to a first base station, then to a second base station at the same time as the first, and then to the second one alone. These changes in attachment of a terminal give rise to modifications to the virtual connections between the said terminal and the said base stations concerned through which the user data pass.

These modifications to the virtual connections should therefore give rise to corresponding modifications to the identifiers.

In the document U.S. Pat. No. 5,787,077, when a mobile terminal enters into the coverage of an access network, the latter assigns to it a virtual connection identifier. The virtual path identifier in the access network is determined in relation to the virtual connection identifier. Virtual channels are used so that a terminal can use more than one logical connection.

When the mobile terminal is in the process of changing base station, a new virtual connection identifier is defined as well as a new virtual path identifier in the network.

With regard to the signalling plane, several designs are provided for in the document U.S. Pat. No. 5,787,077, amongst which it can be cited that a predetermined pair of virtual path and circuit identifiers are defined on the wireless interface so that each terminal in the system uses the same pair.

SUMMARY OF THE INVENTION

The present invention applies in particular to access networks for which each terminal receives or sends user cells on a virtual channel identified by a virtual path identifier fixed once and for all and a virtual circuit identifier which is allocated to it at the time the call is established, and signalling cells on a virtual channel identified by a virtual path identifier and a virtual circuit identifier fixed once and for all. Likewise, the switch is designed to allocate, to each user channel, a virtual path identifier and a virtual circuit identifier and, to each signalling channel, a virtual path identifier equal to the virtual path identifier of the user circuit and a virtual circuit identifier fixed once and for all.

The purpose of the present invention is to propose an access network for mobile terminals which is such that the modifications to the virtual connections when a mobile terminal passes from the coverage of one base station to another are transparent at the terminals and switch used, which are, moreover, items of equipment designed to function with networks for fixed terminals.

To this end, a network according to the invention is characterised in that the local access network is designed to provide the transport of the user cells and that of the signalling cells in channels whose virtual path identifiers are predetermined. It is also characterised in that, when a mobile terminal enters into the coverage of the said network, a signalling channel is formed between the said terminal and the said switch, the switch determining, to do this, a virtual path identifier which, associated with the predetermined signalling virtual circuit identifier, identifies, at the switch, the said signalling channel, and the local access network determining, to do this, a virtual circuit identifier which, associated with the signalling virtual path identifier, identifies, at the said network, the said signalling channel. It is also characterised in that, at the time a communication is established, the switch allocates, to the user channel providing the transport of the user cells of the said communication, a virtual circuit identifier which is associated, at the switch, with the virtual path identifier already allocated to the signalling channel, at the local network, with the virtual path identifier provided for the transport of the user cells, and, at the terminal, with the predetermined virtual path identifier.

According to another characteristic of the invention, means are provided for providing a one-to-one correspondence between the virtual path identifier assigned, at the switch, to the transport of the signalling cells and the virtual circuit identifier assigned, at the local network, to the transport of the same cells.

According to another characteristic of the invention, the virtual circuit identifier assigned, at the local network, to the transport of the same cells is equal to the virtual path identifier assigned, at the switch, to the transport of the signalling cells.

According to another characteristic of the invention, it includes an allocation table which maps, to each virtual path identifier VPI which the switch is capable of allocating to the signalling channel, a group of virtual circuit identifiers VCI different from one VPI identifier to another, the said switch allocating to the user channel, at the time it is formed, at least one virtual circuit identifier from the group corresponding to the virtual path identifier VPI of the said user channel.

According to another characteristic of the invention, it includes an adaptation unit for effecting the translation, both in the uplink direction and in the downlink direction, on the one hand of the virtual path identifiers respectively assigned, in the local network, to the user and signalling cells, into the corresponding predetermined identifiers in the said terminal, and vice versa and, on the other hand, of the virtual circuit identifier assigned, in the local network, to the signalling cells, into the corresponding predetermined identifier in the said terminal, and vice versa.

According to another characteristic of the invention, it includes an adaptation server for effecting the translation, both in the uplink direction and in the downlink direction, on the one hand of the virtual path identifier assigned, in the switch, to the user and signalling cells, into the virtual path identifiers respectively assigned, in the said local network, to the said user and signalling cells, and vice-versa and on the other hand of the virtual circuit identifier assigned, in the switch, to the signalling cells, into the identifier assigned, in the said local network, to the said signalling cells, and vice versa.

According to another characteristic of the invention, the said local access network consists of a distribution network connected on the one hand to a set of concentrators to which the radio base stations are linked in order to establish or release, according to a given marking, the virtual half-connections of the said base stations to the said distribution network and on the other hand cross-connection equipment providing connection of the distribution network to the switch, the said local access network also having an adaptation server through which the said signalling channel passes in order to be able on the one hand to intercept and interpret the signalling messages exchanged between the terminals MT and the switch VCX and then on the other hand, on the basis of the content of these signalling messages, to control the marking of the half-connections in the concentrators.

According to another characteristic of the invention, it includes a routing table in which, to each virtual path identifier capable of being allocated by the switch to a signalling channel, there corresponds the number of the terminal, the said table being updated according to the arrivals and departures of the terminals into and out of the coverage of the access network for mobile terminals RLAM.

BRIEF DESCRIPTION OF THE DRAWINGS

The characteristics of the invention mentioned above, as well as others, will emerge more clearly from a reading of the following description of an example embodiment, the said description being given in relation to the single FIGURE of the accompanying drawing, which is a block diagram of an access network for mobile terminals according to the invention.

DETAILED DESCRIPTION

Figure 1:
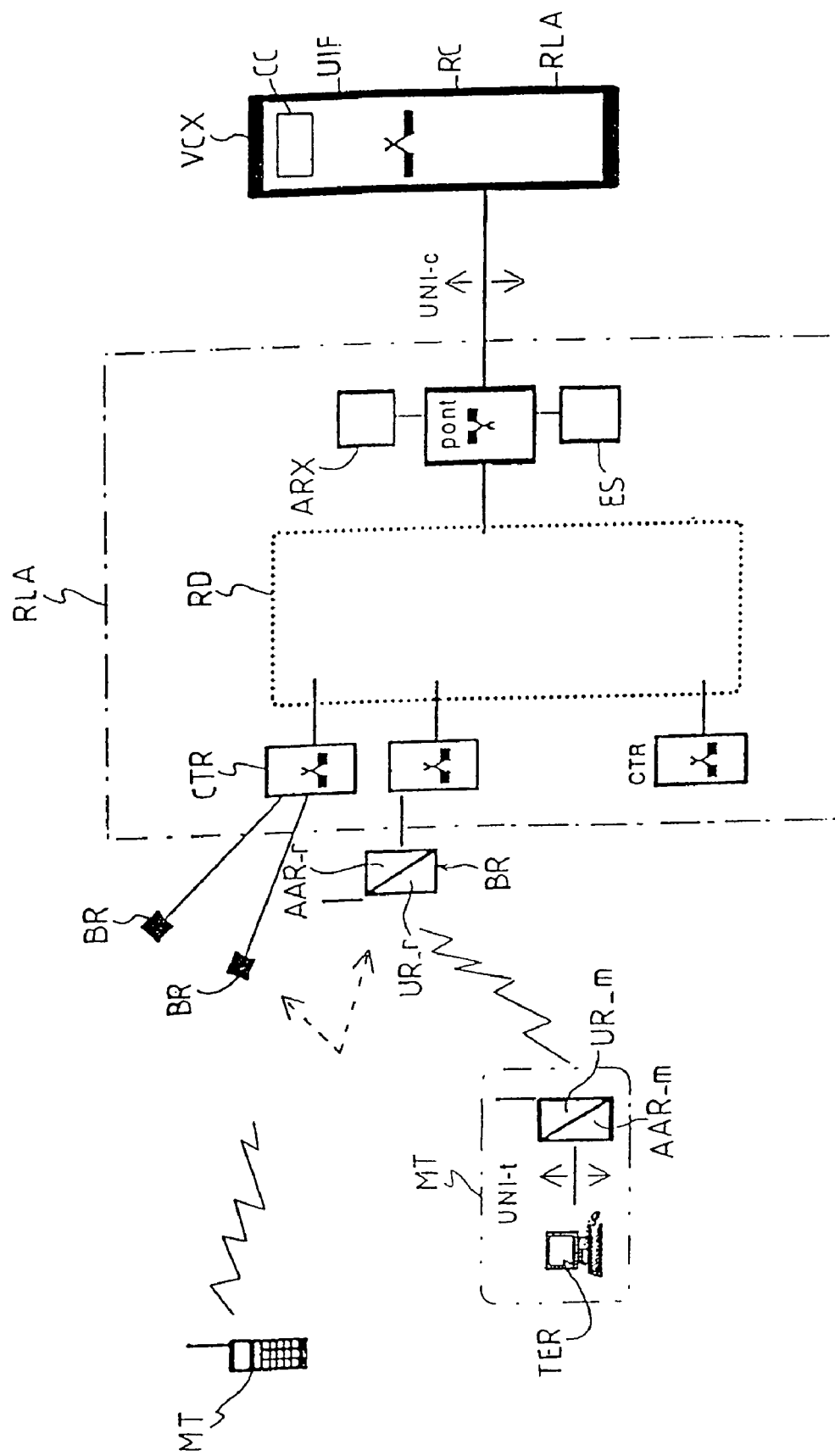

The access network for mobile terminals RLAM depicted in the single FIGURE consists essentially of a switch VCX, a local access network RLA and radio base stations BR. The latter are intended to enter into communication with mobile terminals MT.

The local access network RLA is connected, upstream, to the switch VCX by means, at the ATM layer level, of at least one standard interface UNI_c (User Network Interface) and, downstream, to the radio base stations BR. It consists of a distribution network RD connected on the one hand to a set of concentrators CTR to which the base stations BR are connected and on the other hand to cross-connection equipment BRIDGE of the ATM type providing connection of the distribution network RD to the switch VCX.

The distribution network RD and the cross-connection equipment BRIDGE perform functions of cross-connection of virtual paths VP. These paths are permanent and established when the system is brought into service. Each of them is dedicated to a given type of traffic (user data, signalling, etc). Their topology is of the star type with merging in one direction and dispersal in the other.

The cross-connection equipment BRIDGE also allows passage of the flows of user data or signalling data through or to different items of server equipment, such as any one referenced ES. These items of server equipment can for example be a transcoder, a macrodiversity operator, a security protocol processing unit, a flow control protocol server, etc. Amongst these servers, there has been shown a so-called adaptation server ARX for adapting the access network RLA to the switch VCX.

The concentrators CTR, according to a given marking, establish and release virtual half-connections during the communication establishment and disconnection phases and, possibly, during the phases where a mobile is in communication at the same time with two base stations BR connected to the local network RLA. These last phases are referred to as handover phases.

Half-connections means the virtual links between the radio base stations BR and the access to the cross-connection equipment BRIDGE.

The adaptation server ARX is provided on the one hand to intercept and interpret the signalling messages exchanged between the terminals MT and the switch VCX and then on the other hand, on the basis of the content of these signalling messages, to control the marking of the half-connections in the local access network RLA and in particular in the concentrators CTR of the said local access network RLA.

It should be noted that the adaptation server ARX is transparent to the user traffic since it is concerned only with the signalling flows.

It should be noted that all the half-connections which end at the mobiles MT in communication have a star topology and are of the point-to-point type. In fact they all converge towards the interface UNI_c linking the access network RLA to the switch VCX.

It should also be noted that the path dedicated to the terminal search function (paging) is dispersed for the messages in the downlink direction, that is to say from the switch VCX to the terminals MT.

In addition to the half-connections set up in the user plane and in the control plane, other half-connections are established in the local access network RLA to provide the transport of its internal signalling. This internal signalling concerns the messages necessary for the terminal search function, also referred to as paging, and the messages necessary for local management at the ATM level of the available resources of the local access network RLA and the radio resources. This local signalling takes place between the adaptation server ARX and the base stations BR, or even as far as the ATM/radio adaptation unit AAR_m of the mobile terminals MT.

Each radio base station BR consists of an ATM/radio adaptation unit AAR_r linked, upstream, to a concentrator CTR and, downstream, to a radio unit UR_r which is specific to the radio system used. Each mobile terminal MT consists essentially of a terminal TER proper, which is of the ATM type entirely in conformity with the standards and which is linked to an ATM/radio adaptation unit AAR_m, by means, at the ATM layer level, of an interface UNI-t. The unit AAR_m is itself linked to a radio unit UR_m, which is designed to be able to communicate with the radio unit UR_r of each base station BR of the network. The unit UR_m is specific to the radio system used. Physically, the terminal TER, the adaptation unit AAR_m and the radio unit UR_m can be integrated into the same item of equipment or on the contrary be separate.

The terminal TER supports the stacks of the broadband signalling protocols which are, for example, on the one hand, the one which is specified in ITU recommendation Q2931 and on the other hand the one referred to as SSCOP (service-specific connection-oriented protocol) of the so-called S-AAL adaptation layer.

Each terminal can offer different teleservices such as telephony, access to the Internet and any type of multimedia service, etc.

The switch VCX is upstream linked for example to one or more other local networks for access to mobiles RLAM with a structure identical or not to that depicted in the accompanying single FIGURE and to one or more switched networks with fixed terminals RC.

The role of the switch VCX is to establish the communications call by call from and to the mobiles MT attached to the network for access to mobiles RLAM. It does this under the control of a control unit CC.

More precisely, the half-connections providing the traffic of the cells in the user plane are linked, in the switch VCX, either to outgoing connections, if call communications to outside the network RLAM are concerned, or to half-connections attached to each mobile if local communications between two mobiles attached to the network RLAM are concerned.

As for the half-connections providing the transport of signalling messages exchanged between the terminals MT and the switch VCX during the communication establishment or release phases, these are switched in the switch VCX to the call processing unit CC.

The marking of the connections in the switch VCX is effected call by call by implementing the broadband signalling protocol used, which is for example that specified in ITU recommendation Q2931.

In addition, the call procedure can be relayed to one of the networks to which the switch VCX is linked, which may necessitate an item of equipment called an interworking unit UIF in order to provide the gateway functions if the signalling systems are different.

The local access network RLA itself manages, by means of the adaptation server ARX, the establishment, disconnection and mobility of the bidirectional links which provide the transfer of the user data traffic and the transfer of the signalling messages.

A terminal MT which wishes to establish a call requests, in a first phase known as the preliminary call phase, the creation of an end-to-end signalling channel. This creation of an end-to-end signalling channel is effected as soon as a mobile terminal MT is localized with the network, that is to say from the time when it is in the search condition within the coverage of the network. Messages by radio are exchanged between the mobile terminal MT and the radio base stations BR which it has detected and which have detected it. The purpose of these messages is also to signal to the network the presence of the mobile terminal MT within an area so that it is accessible when a call requests it.

The signalling channel comprises two resources: a radio channel between the terminal MT and the radio base station to which it is attached and a half-connection included in the local access network RLA between the said radio base station BR and the cross-connection equipment BRIDGE.

Once this signalling channel is established, the terminal MT is then in a position, in a second phase known as the "call phase", to exchange end-to-end signalling messages with the switch VCX, notably the messages generated on the one hand by the protocol managing the link level SSCOP and on the other hand the protocol managing the level 3 Q2931. These protocols are located on the one hand in the switch VCX and on the other hand in the terminal MT attached to the local network RLA.

It is the implementation of these protocols which will make it possible to establish the connections in the user plane at the switch VCX and at the terminal MT concerned.

During the handover phases, in which a mobile terminal MT moves between two base stations BR and where the entire family of half-connections attached to the mobile terminal MT will change from one access point to another access point, the adaptation server ARX controls, by means of paths dedicated to the internal signalling of the local access network RLA, the marking in the concentrators CTR of the half-connections concerned at both control plane level and user plane level. As will be seen below, the virtual path and virtual circuit identifiers VPI and VCI of these ATM half-connections are not concerned with this marking and are therefore not modified during these handover phases.

The marking of the half-connections in the concentrators CTR of the local access network RLA is effected, either at the initiative of the mobile terminal MT in question, or at the initiative of the adaptation server ARX itself, according to the characteristic of the radio system according to which it is either the terminal MT or the radio base stations BR which take the initiative with regard to the processes implemented in the handover phase.

It should be noted that the connection established in the switch VCX remains constant throughout the duration of the communication whatever the movements made by the mobile terminal MT as long as the latter remains within the geographical area covered by the radio base stations BR of the access network for mobile terminals RLAM. Thus the dynamic management of the half-connections effected by the adaptation server ARX does not implement the Q2931 and SSCOP signalling protocols because they are solely located in each of the mobiles MT and the switch VCX.

When a terminal MT which is already in the search condition and which is therefore linked to the switch VCX by a signalling channel is called, either by another terminal of the same network or by another terminal of another network, a user channel is created by implementation of the Q2931 protocols at the switch VCX and the terminal MT.

The above-mentioned different channels are created by allocation, to the half-connections concerned, of virtual path and channel identifiers at the interfaces UNI_c and UNI_t and also in the local access network RLA, both in the user plane and in the control plane. These identifiers are allocated in the following manner.

At the interface UNI-t, whether in the user plane or in the control plane, the virtual path identifier VPI is unique and is generally, as for access networks for fixed terminals, equal to zero. As for the virtual circuit identifier VCI in the user plane, this is chosen, for a given communication, by the switch VCX at the time of call establishment implemented by the Q2931 protocol and is kept throughout the duration of the communication. It is equal to VCI_dat. In the control plane, it has a value fixed once and for all, for example equal to five.

At the interface UNI-c, in the user plane and in the control plane, the virtual path identifier VPI is equal to the value VPI_u allocated to the terminal MT when it arrives within the coverage of the access network for mobile terminals RLAM in question (it should be stated that it can do this either by initiation of its search condition, or already in communication and consequently arriving from another access network for mobile terminals RLAM). As for the virtual circuit identifier VCI, this has a value which is, in the user plane, equal to the one VCI_dat which was allocated, by the switch VCX, at the above interface UNI-t. With regard to the control plane, the identifier VCI is also equal to the one allocated at the interface UNI-t, for example five.

In the local access network RLA, each type of traffic (user data, signalling) is transported in permanent virtual paths VP dedicated to it. In the uplink direction (terminals MT to switch VCX), these virtual paths VP originate in the concentrators CTR and make it possible to switch the traffic they transport to the direction which is appropriate: the switch VCX, a server ES such as an item of adaptation equipment, a transcoder, a macrodiversity operator, a security protocol processing unit, etc. In the downlink direction, they switch the traffic to all the concentrators CTR. The topology of the virtual paths VP is therefore a merging in the uplink direction and a dispersal in the downlink direction. By way of example, the VPI assigned to a communication in the user plane is equal to 100.

It should be noted that different types of user traffic could also be differentiated at the level of their processing in the access network by being carried by different virtual paths. For example, the speech signal can be coded at 32 kb/s in the mobile terminal MT whilst it is intended to be switched in a fixed network to a conventional telephone set decoding only signals coded at 64 kb/s. A transcoding type processing must be necessary. The choice of a virtual path VP ending at an appropriate transcoder is essential. If the communication is local, it is the path VP which avoids the transcoder which will be chosen since the two terminals would be capable of communicating at 32 kb/s.

For example, again, data flows and real-time flows have very different quality of service constraints; the first require very low loss rates, the second are demanding with regard to response times. The use of different paths VP will make it possible to switch user traffic to servers in relation to their quality of service requirements.

Within a given path VP, the half-connections are differentiated by means of a virtual circuit identifier VCI. This concerns virtual circuit identifiers VCI of the control plane VCI_sig designed to support end-to-end signalling and in particular allow the transport of messages generated by the SSCOP and Q2931 protocols; it also concerns virtual circuit identifiers VCI of the user plane VCI_dat serving to identify the half-connections carrying the user traffic.

As seen previously, during the preliminary call phase, a signalling channel is created end to end. It is characterised, at the interface UNI_t, by the pair of virtual path/virtual channel identifiers 0/5, at the interface UNI_c by the pair VPI_u/5 and at the local access network RLA by the pair VPs/VCI_sig. The virtual path identifier VPI_u is allocated by the switch VCX. As for the signalling virtual circuit identifier VCI_sig, this is allocated by the adaptation server ARX. There is a one-to-one correspondence between the identifiers VPI_u and VCI_sig. Advantageously, this correspondence is expressed by the equality of these two identifiers: VPI_u=VCI_sig.

As for the virtual circuit identifier VCI_dat, this is allocated during the call phase which is implemented by the Q293 protocol. The messages received or sent by this Q2931 protocol are carried, during this call phase, by the signalling channel created during the preliminary call phase.

The number of values which can be taken by the virtual circuit identifiers VCI_sig depends on the maximum number of communications which an access network for mobile terminals RLAM is induced to manage simultaneously; this number can be less than the number of terminals MT. The number of values VCI-dat which can be taken by the virtual circuit identifiers in the user plane is generally greater than the number of values which can be taken by the virtual circuit identifiers VCI_sig since one and the same communication can consist of several half-connections conveying several distinct traffic flows identified by distinct virtual circuit identifiers VCI-dat.

Other virtual path and circuit identifiers VPI/VCI are dedicated to the signalling protocols internal to the local access network RLA.

A pair VPI_u/VCI_dat is thus allocated to each mobile for the entire duration of the communication as long as it remains within the coverage of the access network for mobile terminals RLAM. These identifiers will keep the same value whatever the movements of the mobile. On the other hand, they are not the property of the terminal MT, which amounts to stating that they will a priori be different from one call to another for the same terminal.

The adaptation unit AAR_m is designed to provide the translation, both in the uplink direction (mobiles to switch) and in the downlink direction (switch to mobiles), of the signalling virtual circuit identifier VCI_sig in the local network RLA into the constant virtual circuit identifier, generally equal to 5, in the terminal MT.

On the other hand, it does not need to provide the translation of the virtual circuit identifiers in the user plane, either in the uplink direction or in the downlink direction. This is because the virtual circuit identifiers VCI_dat of the user half-connections passing through the access network for mobile terminals RLAM are allocated by the switch VCX during the call establishment phase and are not changed thereafter.

In the uplink direction (mobiles to switch), the virtual path identifier VPI (constant and generally equal to 0 at the interface UNI_t of the terminal MT) is translated, by the adaptation unit AAR_m, into a code which identifies the virtual path VP of the local access network RLA dedicated to the service required, either the path which switches the cells to a given server ES, or the path which switches the cells directly to the cross-connection equipment BRIDGE.

In the latter case, the identifier VPI is the one which is assigned simply to the transport of user cells in the local access network RLA, whose value is for example 100 (see above). The adaptation server ARX sends a message which is communicated to the adaptation unit AAR-m during the communication establishment phase in order to advise it of the choice of virtual path VP which has been made.

In the downlink direction (switch to mobiles), the adaptation unit AAR_m effects the translations of the virtual path identifiers VPI into the value which is peculiar to the interface UNI_t of the terminal, generally equal to zero.

In the adaptation server ARX, translations are also effected. In the uplink direction (terminals to switch), the value of the identifier VPI of the path VP serving for the transport of user cells in the local access network RLA is translated into the value VPI_u allocated to the terminal when it arrived within the coverage of the access network for mobile terminals RLAM.

For this purpose, the adaptation server ARX consults a local table which was updated during the establishment of the communication and in which, on the one hand, it seeks the value VPI_u of the virtual path identifier which corresponds to the value of the virtual circuit identifier VCI_dat read from the header of the ATM cell and then, on the other hand, it assigns to it the virtual path identifier of the said cell.

In the downlink direction (switch to terminals), the value VPI_u of the virtual path identifier is translated into a code which identifies the path VP according to the service required, generally the one assigned simply to the transport of user cells whose value is for example 100. This choice was recorded in the adaptation server ARX during the communication establishment phase.

In the case of an access network for mobile terminals RLAM like the one of the invention, to each communication with a terminal MT there corresponds a virtual path VP whose value VPI_u was allocated at the moment when this terminal MT arrived within the coverage of the access network for mobile terminals RLAM.

It should be noted that the directory number associated with a VPI can change over time. Thus, if a mobile leaves the access network for mobile terminals RLAM, its directory number disappears from the routing table, the associated VPI becomes free and can be associated with the directory number of a new terminal which has made itself known to the access network for mobile terminals RLAM by passing into its radio coverage.

For the dynamic management of allocation of the virtual path identifiers VPI_u, the switch VCX has a routing table in which, to each virtual path identifier VPI_u, there corresponds the number of the terminal (NSAP or E164 addresses). This table is updated according to the arrivals and departures of the terminals into or out of the coverage of the access network for mobile terminals RLAM. This updating is advantageously effected under the control of the adaptation server ARX.

In addition, since the distribution network RD assigns only one virtual path VP for each type of cell flow, to each communication with a terminal MT there corresponds, at the user plane level, one (or possibly several predetermined) virtual circuits with identifiers VCI_dat. It should be noted that, in fact, several connections can be established within one communication. They will all bear the same virtual path identifier and will therefore be differentiated only by their virtual circuit identifier VCI, unlike what happens generally, for example at a switch VCX, where they are differentiated not only by their virtual circuit identifier but also by their virtual path identifier.

To avoid the switch VCX allocating the same virtual circuit identifier VCI_dat twice for connections whose virtual path identifiers VPI_U are different, an allocation table has been provided which, according to each virtual path identifier VPI, lists only the virtual circuit identifiers VCI available for this identifier VPI. By way of example, for the path identifier VPI=20, it is possible to establish a communication using virtual circuit identifiers VCI ranging from the values 1000 to 1010, for the path identifier VPI=21, virtual circuit identifiers VCI from 1011 to 1020 etc.

Thus, when there is a request to establish a call from a terminal MT identified by a directory number to which a virtual path identifier value VPI_u has already been allocated, the switch VCX will seek, in this allocation table, one or more virtual circuit identifier values VCI available for this identifier VPI_u.

What is claimed is:

1. Access network for mobile terminals comprising:
a switch (VCX) arranged to be linked to at least one external network and to a local access network (RLA), said local access network (RLA) being connected to a plurality of radio base stations (BR), each radio base station being arranged to enter into communication with mobile terminals (MT), each mobile terminal (MT) being arranged for receiving or sending user cells on a virtual channel identifiable by a fixed virtual path identifier and a virtual circuit identifier allocated to said virtual path identifier at the time a call is established, and signaling cells on a virtual channel identifiable by a virtual path identifier and a fixed virtual circuit identifier, the switch (VCX) being arranged to allocate, to each of a group of user channels, a virtual path identifier and a virtual circuit identifier and, to each of a group of signaling channels, a virtual path identifier equal to the virtual path identifier of the user channel and a fixed virtual circuit identifier, the local access network (RLA) being arranged to transport the user cells, the signaling cells in channels having predetermined virtual path identifiers, and the mobile terminal (MT) and the local access network being arranged so that in response to the mobile terminal entering into the coverage of said local access network, a signaling channel is formed between said terminal (MT) and said switch (VCX), the switch (VCX) being arranged for determining a virtual path identifier (VPIu) which, associated with the predetermined signaling virtual circuit identifier, is arranged for identifying said signaling channel at the switch (VCX), and the local access network (RLA) being arranged for determining a virtual circuit identifier (VCI-sig), which, associated with the signaling virtual path identifier, is arranged for identifying, at said local access network (RLA), said signaling channel, and at the time a communication is established, the switch (VCX) is arranged to allocate, to the user channel providing the transport of the user cells of said communication, a virtual circuit identifier (VCI dat) which is associated, at the switch (VCX), with the virtual path identifier (VPIu) already allocated to the signaling channel, at the local access network (RLA), with the virtual path identifier for the transport of the user cells, and, at the terminal, with the predetermined virtual path identifier.

2. Access network for mobile terminals according to claim 1, further comprising means for providing a one-to-one correspondence between the virtual path identifier (VPIu) assigned, at the switch (VCX), to the transport of the signaling cells and the virtual circuit identifier (VCI sig) assigned, at the local access network (RLA), to the transport of the same cells.

3. Access network for mobile terminals according to claim 1, wherein the virtual circuit identifier (VCI sig) assigned, at the local access network (RLA), to the transport of the same cells is equal to the virtual path identifier (VPIu) assigned, at the switch (VCX), to the transport of the signaling cells.

4. Access network for mobile terminals according to claim 1, further including an allocation table for mapping, to each virtual path identifier VPI which the switch (VCX) is capable of allocating to a signaling channel, a group of virtual circuit identifiers VCI different from one VPI identifier to another, said switch (VCX) being arranged for allocating to the user channel, at the time it is connected, at least one virtual circuit identifier (VCI_dat) from the group corresponding to the virtual path identifier (VPI_u) of said user channel.

5. Access network for mobile terminals according to claim 1, further including an adaptation unit for effecting the translation, both in the uplink direction and in the downlink direction, of (a) the virtual path identifiers respectively assigned, in the local network (RLA), to the user cells and the signaling cells, into the corresponding predetermined identifiers in said terminal (MT), and vice versa and, (b) the virtual circuit identifier assigned, in the local network (RLA), to the signaling cells, into the corresponding predetermined identifier in said terminal (MT), and vice versa.

6. Access network for mobile terminals according to claim 1, further including an adaptation server (ARX) for effecting the translation, both in the uplink direction and in the downlink direction, of (a) the virtual path identifier assigned, in the switch (VCX), to the user cells and the signaling cells, into the virtual path identifiers respectively assigned, in said local access network (RLA), to said user and signaling cells, and vice versa and (b) the virtual circuit identifier assigned, in the switch (VCX), to the signaling cells, into the identifier assigned, in said local network, to said signaling cells, and vice versa.

7. Access network for mobile terminals according to claim 1, wherein said local access network (RLA) comprises a distribution network (RD) connected to (a) a set of concentrators (CTR) to which the radio base stations (BR) are linked in order to establish or release, according to a given marking, the virtual half-connections of said base stations (BR) to said distribution network (RD) and (b) cross-connection equipment (BRIDGE) for providing connection of the distribution network (RD) to the switch (VCX), said local access network (RLA) also having an adaption server (ARX) arranged so said signaling channel passes through it in order to be able to (a) intercept and interpret the signaling messages exchanged between the terminals (MT) and the switch (VCX) and (b) control the marking of the half-connections in the concentrators (CTR) on the basis of the content of these signaling messages.

8. Access network for mobile terminals according to claim 1, further including a routing table in which, to each virtual path identifer capable of being allocated by the switch to each signaling channel, corresponding to the number of terminals, said table being arranged to be updated according to arrivals and departures of terminals into and out of the coverage of the access network for mobile terminals RLAM.

* * * * *